United States Patent [19]

Schwartz et al.

[11] Patent Number: 4,620,738

[45] Date of Patent: Nov. 4, 1986

[54] VACUUM PICK FOR SEMICONDUCTOR WAFERS

[75] Inventors: Vladimir Schwartz, Lexington; Avrum Freytsis, Swampscott, both of Mass.

[73] Assignee: Varian Associates, Inc., Palo Alto, Calif.

[21] Appl. No.: 766,458

[22] Filed: Aug. 19, 1985

[51] Int. Cl.[4] ................................................ B66C 1/02
[52] U.S. Cl. ...................................... 294/64.1; 271/90
[58] Field of Search .................... 294/64.1, 64.2, 64.3, 294/65; 271/90, 93, 107, 132; 414/114, 121, 752, 787; 269/21; 279/3

[56] References Cited

U.S. PATENT DOCUMENTS

| | | | |
|---|---|---|---|
| 2,850,279 | 9/1958 | Stoothoff et al. | 271/26 |
| 3,158,381 | 11/1964 | Yamamura | 279/3 |
| 3,484,093 | 12/1969 | Mermelstein | 269/21 |
| 3,711,081 | 1/1973 | Cachon | 269/21 |
| 4,002,254 | 1/1977 | Olofsen | 214/300 |
| 4,221,356 | 9/1980 | Fortune | 248/363 |
| 4,294,424 | 10/1981 | Teissier | 248/362 |
| 4,391,511 | 7/1983 | Akiyama et al. | 355/40 |
| 4,493,606 | 1/1985 | Foulke et al. | 414/787 |
| 4,496,180 | 1/1985 | Hillman et al. | 294/64.1 |
| 4,506,184 | 3/1985 | Siddall | 310/328 |

Primary Examiner—James B. Marbert
Attorney, Agent, or Firm—Stanley Z. Cole; William R. McClellan

[57] ABSTRACT

A vacuum pick suitable for removing semiconductor wafers from and replacing wafers in a cassette holder. The vacuum pick includes a thin profile housing having a wafer support surface with a cavity therein, a resilient, flexible member covering a portion of the cavity to form an enclosure, and a rigid chuck mounted on the flexible member so as to permit movement of the chuck relative to the housing. The chuck includes a wafer-receiving surface connected through a passage to the enclosure. When a vacuum is applied to the enclosure, the wafer and the chuck are retracted against the housing and held firmly in place. The chuck tilts relative to the housing when it contacts a tilted wafer, thereby insuring reliable attachment to the wafer.

10 Claims, 6 Drawing Figures

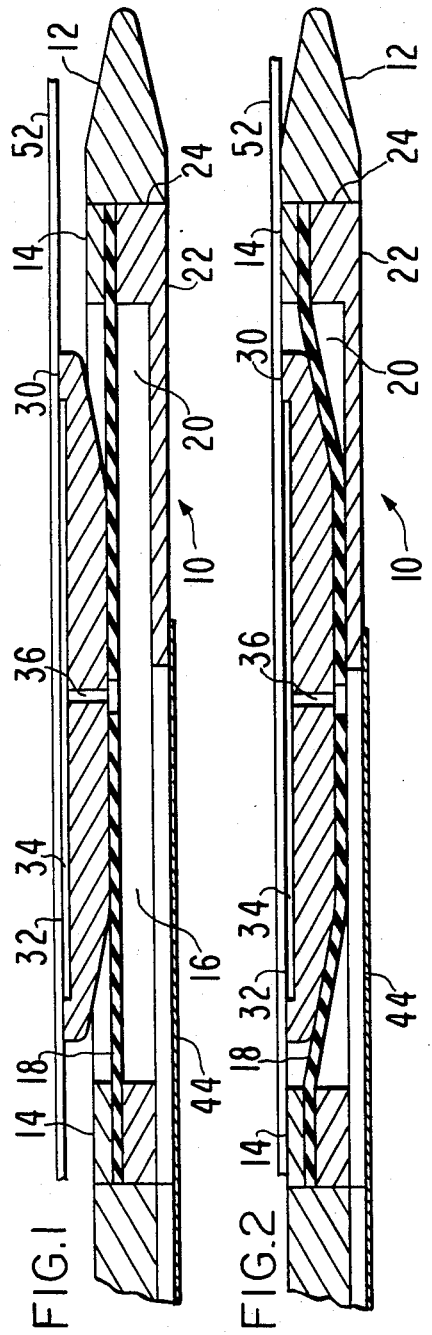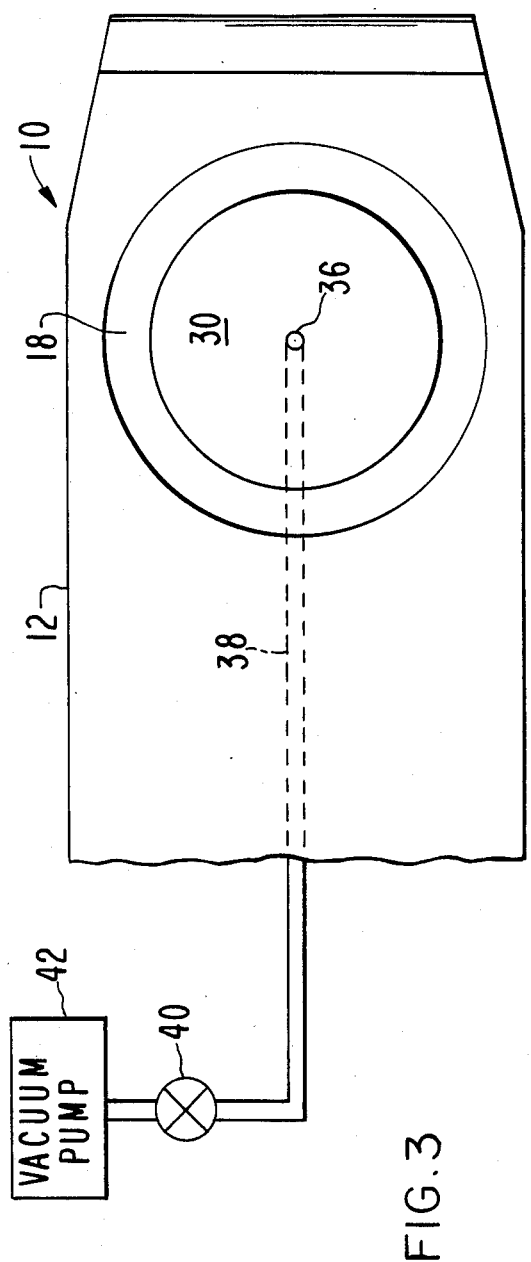

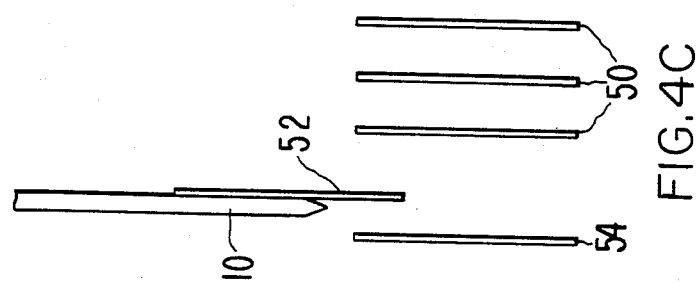
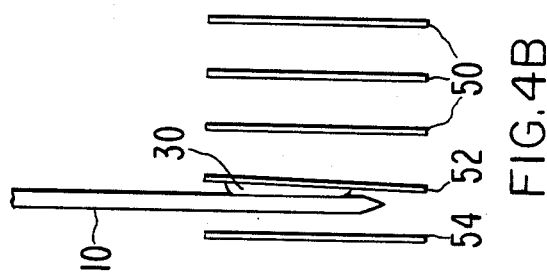
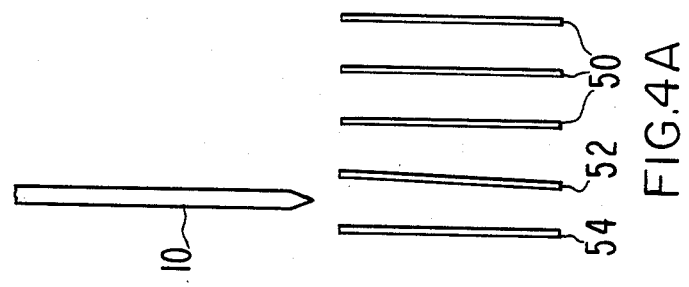

VACUUM PICK FOR SEMICONDUCTOR WAFERS

BACKGROUND OF THE INVENTION

This invention relates to vacuum picks for handling semiconductor wafers, and more particularly, to a vacuum pick suitable for removing and inserting wafers in a cassette wafer holder.

In the fabrication of semiconductor devices, semiconductor wafers are subjected to a series of processing steps in individual processing systems such as ion implanters, thermal processors, sputtering systems, and etching systems. For each processing system it is necessary to introduce the wafers into the required processing position and then to remove the wafer after processing. For commercial processing systems, automated wafer handling has been used to increase throughput and reduce the contamination and damage associated with manual handling. As devices become smaller and more complex, the risk of defects from even micron size particles increases. It is, therefore, necessary that automated wafer handling devices not introduce contamination or damage the fragile wafers.

It has become standard in the semiconductor industry to store and transport semiconductor wafers in so-called cassettes wherein a plurality of wafers is stored upright in closely-spaced, facing alignment. The wafers can be accessed from above or below.

One prior art technique for removing wafers from cassettes involves positioning the cassette vertically with the wafers horizontally oriented and utilizing a pair of moving belts to remove wafers one at a time as the cassette is indexed vertically. This arrangement has the disadvantage that the horizontally-oriented wafers can collect particulate contamination on their upper surface. In addition, the belt system cannot access wafers randomly in the cassette, but must start at one end and successively remove each wafer until all are removed.

In another technique for handling wafers in a cassette, a wafer lift blade, having a leading edge which is curved and grooved to accommodate the wafer edge, accesses wafers from below and lifts them vertically to a processing station. This edgewise handling technique can access wafers randomly in the cassette and has proven generally satisfactory. However, edge handling results in some abrasion and generation of particulates.

Vacuum picks have also been utilized for handling of semiconductor wafers. Typically, the rear surface of the wafer is held to the support surface of a vacuum pick by vacuum suction. However, vacuum picks have not been used for direct removal of wafers from cassettes due to the uncertainty in wafer position, tipping of the wafer in its slot, and tolerances in the cassette itself. These factors make it difficult to reliably remove and replace wafers in a cassette without damage to adjacent wafers.

It is a general object of the present invention to provide a novel vacuum pick for handling of thin, disk-like workpieces.

It is another object of the present invention to provide a novel vacuum pick for accessing closely-spaced semiconductor wafers.

It is still another object of the present invention to provide a novel vacuum pick which has a flexible workpiece gripping means to compensate for variations in workpiece position.

SUMMARY OF THE INVENTION

According to the present invention, these and other objects and advantages are achieved in a vacuum pick comprising a housing having a workpiece support surface with a cavity therein, a resilient, flexible member covering at least a portion of the cavity to form an enclosure, a rigid chuck mounted on the flexible member to permit movement of the chuck relative to the housing, the chuck having a substantially flat surface portion for receiving a workpiece, and vacuum source means connected to the enclosure. The chuck and the flexible member have a passage therethrough providing a fluid connection between the surface portion of the chuck and the enclosure. The chuck has an extended position when vacuum is not applied to the enclosure, and a retracted position when vacuum is applied to the enclosure. The workpiece is drawn against the support surface of the housing when the chuck is in the retracted position.

BRIEF DESCRIPTION OF THE DRAWINGS

For better understanding of the present invention, together with other and further objects, advantages, and capabilities thereof, reference may be had to the accompanying drawings which are incorporated herein by reference and in which:

FIG. 1 is a cross-sectional view of a vacuum pick in accordance with the present invention in the extended position;

FIG. 2 is a cross-sectional view of the vacuum pick of FIG. 1 shown in the retracted position;

FIG. 3 is a front view of the vacuum pick shown in FIGS. 1 and 2; and

FIGS. 4A-4C illustrate the lifting of a wafer from a group of closely spaced wafers.

DETAILED DESCRIPTION OF THE INVENTION

Cross-sectional views of a vacuum pick 10 in accordance with the present invention are shown in FIGS. 1 and 2. A front view of the vacuum pick 10 is shown in FIG. 3 (not to the same scale as FIGS. 1 and 2). The vacuum pick 10 includes a thin elongated housing 12, the tip portion of which is shown in FIGS. 1-3. The thin, elongated shape of the housing 12 permits the pick to be introduced between closely-spaced semiconductor wafers for removal of prescribed individual wafers. The end of the housing 12 opposite that shown is connected to a mechanical control apparatus for positioning the vacuum pick and controlling the vacuum applied thereto. In a preferred embodiment, the vacuum pick 10 is at the end of a robot arm for automated wafer handling.

On one side of the housing 12 is a generally flat wafer support surface 14, having a shallow cylindrical cavity 16 therein. At least a portion of the cavity 16 is covered by a thin, resilient flexible member 18 to form an enclosed region 20. The flexible member 18 is typically a thin pad of rubber attached at its periphery to the housing 12. In a preferred embodiment, a generally circular housing portion 22 mounts in a mating recess 24 in the housing 12. The flexible member 18 is bonded to the housing portion 22 in the recess 24 by an appropriate adhesive such as RTV. The housing portion 22 is then positioned in the recess 24 and attached by suitable mounting hardware. The flexible member 18 is mounted parallel to, but spaced from the plane, of the wafer support surface 14.

Attached to the flexible member 18 by appropriate adhesive, such as RTV, is a rigid, generally disk-shaped chuck 30. The chuck 30 includes a generally flat wafer-receiving surface 32 with a shallow recessed portion 34 which insures uniform distribution of the vacuum suction. A fluid passage 36 extends from the wafer-receiving surface 32, through the chuck 30 and through the flexible member 18, to the enclosed region 20. A fluid passage 38 in the housing 12 connects the enclosed region 20 through a control valve 40 to a vacuum pump 42. In the example of FIGS. 1-3, the passage 38 is milled in the back surface of the pick assembly 10 and covered with adhesive tape 44 so as to achieve a thin profile. It will be understood that the passage 38 can be formed in any convenient manner. The control valve 40 controls application of vacuum to the pick assembly 10 and, preferably, is controlled by a computer or other electronic controller. The leading edge of the housing 12 is tapered so as to deflect the vacuum pick assembly 10 away from the workpiece in case of inadvertent contact with the workpiece edge so as to prevent damage.

With no vacuum applied to the enclosed region 20, the resiliency of the flexible member 18 causes the chuck 30 to be in an extended position, as shown in FIG. 1. In the extended position, the wafer-receiving surface 34 is extended outwardly beyond the wafer support surface 14. In this position, the chuck 30 can, to a limited extent, move inwardly or outwardly and tilt, or rotate, through a few degrees relative to the housing 12 so as to make contact with the back surface of a wafer. The tilting is advantageous in making firm and reliable contact with a wafer surface which may be tilted in its position in a cassette.

When a vacuum is applied to the enclosed region 20, the flexible member 18 and the chuck 30 are drawn into the cavity 16 to a retracted position. In the retracted position, the wafer support surface 14 and the wafer-receiving surface 32 of the chuck 30 are coplanar such that the wafer is held by vacuum suction against both surfaces. In the retracted position, the flexible member 18 is somewhat stretched. Thus, when the vacuum is removed from the enclosed region 20, the chuck 30 returns to the extended position, as shown in FIG. 1, due to the resiliency of the flexible member 18.

The diameter of the fluid passage 36 is selected, for a prescribed vacuum level, to permit retraction of the chuck 30 into the cavity 16 with or without a wafer attached and to permit reliable attachment to the wafer. In one example, the fluid passage is 0.025-inch in diameter, and a vacuum level of about 20-25 inches of mercury is used.

The operation of the vacuum pick 10 in removing wafers from a cassette holder is illustrated in FIGS. 4A-4C. A plurality of wafers 50, 52, 54 is positioned in a cassette in upstanding, facing alignment as shown in FIG. 4A. The structure of the cassette is omitted for simplicity. The wafer 52 to be removed is slightly tilted in its slot. The vacuum pick 10 is positioned above the wafers between the wafer 52 and the adjacent wafer 54. Vacuum is applied to the pick 10 so that the chuck 30 is in the retracted position. The vacuum pick 10 is then lowered between the wafers 52 and 54, as shown in FIG. 4B, and the vacuum is removed from the pick by closing the valve 40. The chuck 30 moves to its extended position and contacts the back surface of the wafer 52. Due to the flexibility of the member 18, the chuck 30 conforms to the back surface of the tilted wafer 52. Vacuum is again applied to the vacuum pick 10 by opening the valve 40, thereby causing the chuck 30 and the wafer 52 to be drawn to the retracted position wherein the wafer 52 is in contact with the support surface 14 of the pick 10. The vacuum pick 10 is then lifted vertically with the wafer 52 firmly held in place, as shown in FIG. 4C. It will be understood that the above process is reversed for replacing the wafer 52 in the cassette. Similarly, the remaining wafers can be removed for processing and later replaced in the cassette. It can be seen that the pick must be precisely positioned between the closely spaced wafers to avoid contact between the back surface of the pick 10 and the front surface of the wafer adjacent to the one being removed. The thin profile of the vacuum pick 10 in accordance with the present invention permits access between the wafers without contact. The extendable chuck 30 permits reliable contact and holding of wafers to be removed.

While there has been shown and described what is at present considered the preferred embodiments of the invention, it will be obvious to those skilled in the art that various changes and modifications may be made therein without departing from the scope of the invention as defined by the appended claims. The present invention has been described with reference to holding and moving semiconductor wafers. However, the vacuum pick shown and described herein can be used with any relatively lightweight article having a flat surface for attachment.

I claim:

1. A vacuum pick comprising:
   a housing having a workpiece support surface with a cavity therein;
   a resilient flexible member covering at least a portion of the cavity to form an enclosure;
   a rigid chuck mounted on the flexible member to permit movement of the chuck relative to the housing, the chuck having a substantially flat surface portion for receiving a workpiece;
   vacuum source means connected to the enclosure, the chuck and the flexible member having a passage therethrough providing a fluid connection between the surface portion of the chuck and the enclosure, the chuck having an extended position when vacuum is not applied to the enclosure and a retracted position when vacuum is applied to the enclosure, the workpiece being drawn against the support surface of the housing when the chuck is in the retracted position.

2. The vacuum pick as defined in claim 1 wherein the workpiece support surface of the housing and the surface portion of the chuck are substantially coplanar in the retracted position.

3. The vacuum pick as defined in claim 2 wherein the housing is elongated with the cavity, the flexible member and the chuck positioned near one end thereof.

4. The vacuum pick as defined in claim 3 wherein the housing has a thin profile adapted for access between closely-spaced workpieces.

5. The vacuum pick as defined in claim 4 adapted for holding semiconductor wafers.

6. The vacuum pick as defined in claim 5 wherein the housing includes a fluid passage for connecting a vacuum source to the enclosure.

7. The vacuum pick as defined in claim 6 wherein the cavity has a shallow cylindrical shape.

8. The vacuum pick as defined in claim 7 wherein the chuck is generally disk-shaped with a diameter smaller than that of the cavity.

9. The vacuum pick as defined in claim 8 wherein the surface portion of the chuck has a recessed area.

10. The vacuum pick as defined in claim 9 wherein the vacuum source means includes control means for applying vacuum to the enclosure when holding of a wafer is desired.

* * * * *